(12) United States Patent
Lee et al.

(10) Patent No.: US 11,275,462 B2
(45) Date of Patent: Mar. 15, 2022

(54) TOUCH DISPLAY DEVICE

(71) Applicant: LG Display Co., Ltd., Seoul (KR)

(72) Inventors: HwiDeuk Lee, Paju-si (KR); YongChan Park, Paju-si (KR); Taeyun Kim, Paju-si (KR); Yangsik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/985,013

(22) Filed: Aug. 4, 2020

(65) Prior Publication Data

US 2021/0124448 A1    Apr. 29, 2021

(30) Foreign Application Priority Data

Oct. 28, 2019 (KR) .................. 10-2019-0134636

(51) Int. Cl.
*G06F 3/041*    (2006.01)
*G06F 3/044*    (2006.01)

(52) U.S. Cl.
CPC .......... *G06F 3/0412* (2013.01); *G06F 3/0445* (2019.05); *G06F 2203/04107* (2013.01); *G06F 2203/04112* (2013.01)

(58) Field of Classification Search
CPC .... G06F 3/0445; G06F 3/0412; G06F 3/0443; G06F 3/04166; G06F 2203/04107; G06F 2203/04112
See application file for complete search history.

(56) References Cited

U.S. PATENT DOCUMENTS

| | | | |
|---|---|---|---|
| 2009/0267916 A1* | 10/2009 | Hotelling | G06F 3/0446 345/174 |
| 2013/0093706 A1* | 4/2013 | Kurasawa | G09G 3/2074 345/173 |
| 2021/0083013 A1* | 3/2021 | Bang | G06F 3/0412 |

* cited by examiner

*Primary Examiner* — Deeprose Subedi
(74) *Attorney, Agent, or Firm* — Fenwick & West LLP

(57) ABSTRACT

The present disclosure relates to a touch display device, and more specifically, relates to a touch display device having a bottom emission structure. According to the touch display device, by disposing a touch electrode and a touch planarization layer between a substrate and a thin film transistor, a touch sensing function can be implemented without affecting the disposing of components for display driving. Further, by disposing a shielding electrode to which a constant voltage or a signal equal to a touch driving signal is applied between the touch electrode and a light emitting element, a noise of a touch sensing signal caused by display driving can be reduced and the performance of touch sensing performed together with the display driving can be improved.

19 Claims, 17 Drawing Sheets

TOUCH DISPLAY DEVICE

CROSS-REFERENCE TO RELATED APPLICATIONS

This application claims the priority benefit of Republic of Korea Patent Application No. 10-2019-0134636, filed on Oct. 28, 2019 in the Korean Intellectual Property Office, the disclosure of which is incorporated herein by reference in its entirety

BACKGROUND

1. Technical Field

The present disclosure relates to touch display devices.

2. Description of the Related Art

As the information society has developed, there are increasing needs for display devices displaying images Recently, various types of display devices, such as a liquid crystal display device, an organic light emitting display device, a quantum dot display device, and the like, have been developed and utilized.

In order to provide more various functions to a user, some touch sensing enabled display devices provide a function of detecting a touch of a user contacting a display panel and then processing the input of the user based on the detected information.

For example, in a state where a plurality of touch electrodes is arranged on the display panel and a touch driving signal is applied to the touch electrodes, a touch of a user on the display panel can be detected by sensing a change in capacitances caused by the touch of the user.

Here, a plurality of electrodes and several types of signal lines for display driving may be arranged on the display panel. Accordingly, there are several substantial difficulties to arrange electrodes for touch sensing on the display panel. Further, there is a problem that the accuracy and sensitivity of touch sensing may be deteriorated due to parasitic capacitances formed between electrodes for display driving and electrodes for touch sensing.

SUMMARY

In accordance with embodiments of the present disclosure, provided are methods for performing a touch sensing function in a display device with a rear emission structure in which images are displayed to a rear surface of a substrate included in the display device.

In accordance with embodiments of the present disclosure, provided are methods for reducing a noise of a touch sensing signal caused by display driving in a display device with a structure in which a plurality of touch electrodes is arranged.

In accordance with one aspect of the present disclosure, a touch display device may be provided that includes a substrate, a plurality of thin film transistors disposed over the substrate, a plurality of light emitting elements disposed over thin film transistors, a plurality of touch electrodes disposed over the substrate and located under the thin film transistors, a plurality of touch routing lines electrically connected to the touch electrodes, and at least one shielding electrode located over at least one of the touch electrodes and at least one of the touch routing lines, located under at least one of the thin film transistors, and disposed in an area overlapping with at least a part of the at least one of the touch electrodes and the at least one of the touch routing lines.

In accordance with another aspect of the present disclosure, a touch display device may be provided that includes a substrate, a plurality of light emitting elements disposed over the substrate, a plurality of touch electrodes located between the substrate and the light emitting elements, a plurality of touch routing lines electrically connected to the plurality of touch electrodes, and a plurality of shielding electrodes located between the touch electrodes and the touch routing lines and the light emitting elements, and disposed to correspond to at least two or more of the touch electrodes, in which the touch electrodes and the shielding electrodes are sequentially driven in a direction in which the touch routing lines are arranged.

In accordance with further another aspect of the present disclosure, a touch display device may be provided that includes a substrate, a plurality of light emitting elements disposed over the substrate, a plurality of touch electrodes located between the substrate and the light emitting elements, a plurality of touch routing lines electrically connected to the touch electrodes, and a plurality of shielding electrodes located between the touch electrodes and the touch routing lines and the light emitting elements, and disposed to correspond to at least two or more of the touch electrodes, in which the touch electrodes and the shielding electrodes are sequentially driven along a direction intersecting a direction in which the touch routing lines are arranged.

In accordance with embodiments of the present disclosure, it is possible to provide a touch sensing function in a display device with a rear emission structure by arranging a touch electrode and a touch routing line prior to disposing a thin film transistor over a substrate of a display device.

In accordance with embodiments of the present disclosure, it is possible to reduce a noise of a touch sensing signal caused by display driving by disposing a shielding electrode between a touch electrode and a thin film transistor and a light emitting element.

DETAILED DESCRIPTION

Figure 1:
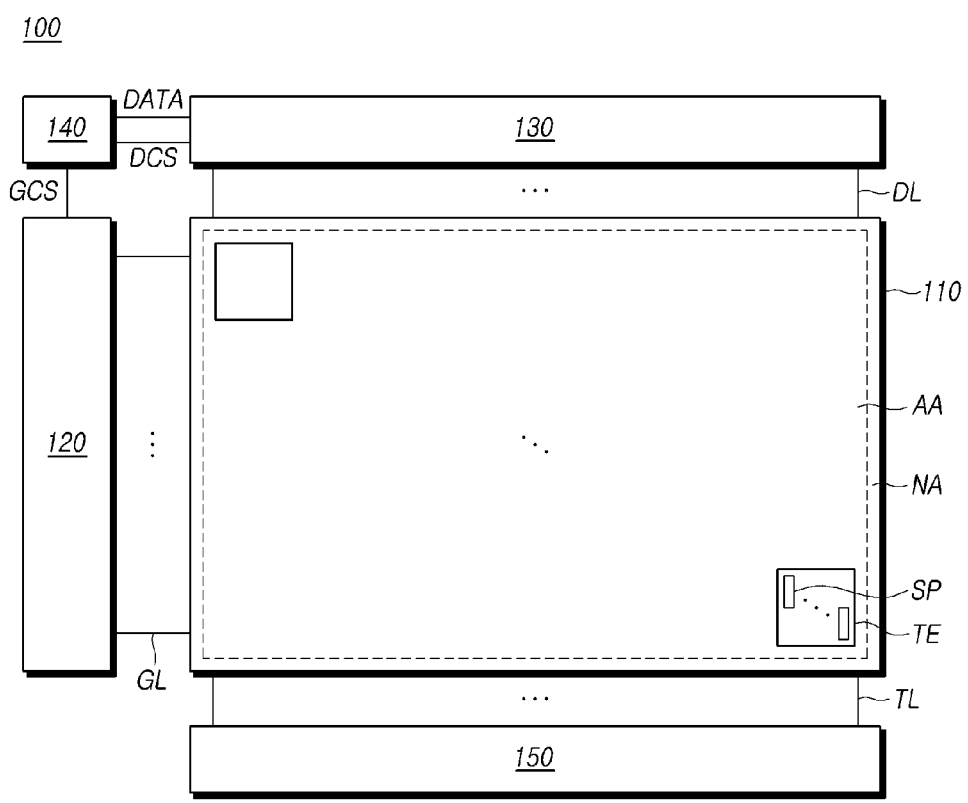
FIG. 1 schematically illustrates a configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only." As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 schematically illustrates a configuration of a touch display device 100 according to embodiments of the present disclosure.

Referring to FIG. 1, a touch display device 100 in accordance with embodiments of the present disclosure includes a touch display panel 110 including an active area AA in which a plurality of sub-pixel SP is disposed and a non-active area NA located outside of the active area AA. The touch display device 100 may include a gate driving circuit 120, a data driving circuit 130, a controller 140, and the like, for driving several types of signal lines arranged in the touch display panel 110.

A plurality of data lines DL and a plurality of gate lines GL are arranged in the touch display panel 110, and the plurality of subpixels SP is disposed in areas in which the data lines DL and the gate lines GL intersect.

The gate driving circuit 120 is controlled by the controller 140, and controls driving timings of the plurality of subpixels SP by sequentially outputting scan signals to the plurality of gate lines GL arranged in touch display panel 110.

The gate driving circuit 120 may include one or more gate driver integrated circuits GDIC. The gate driving circuit 120 may be located on one side or both sides of the touch display panel 110, such as, a left or right side, a top or bottom side, the left and right sides, or the top and bottom sides, according to a driving scheme.

Each gate driver integrated circuit GDIC may be connected to a pad, such as a bonding pad, of the touch display panel 110 in a type of a tape automated bonding TAB or a type of a chip on glass COG, or be directly disposed on the touch display panel 110 in a type of a gate in panel GIP. In some instances, the gate driver integrated circuit GDIC may be disposed to be integrated into the touch display panel 110. Each gate driver integrated circuit GDIC may be implemented in a type of a chip on film COF, which is mounted on a film connected to the touch display panel 110.

The data driving circuit 130 receives image data from the controller 140 and then converts the received image data into analog data voltages. The data driving circuit 130 outputs a data voltage to each data line DL according to a timing at which a scan signal through the gate line GL is applied, and enables each subpixel SP to emit light according to the image data.

The data driving circuit 130 may include one or more source driver integrated circuits SDIC.

Each source driver integrated circuit SDIC may include a shift register, a latch circuit, a digital to analog converter, an output buffer, and the like.

Each source driver integrated circuit SDIC may be connected to a pad, such as a bonding pad, of touch display panel 110 in the type of the tape automated bonding TAB or the type of the chip on glass COG, or be directly disposed on the touch display panel 110. In some instances, the source driver integrated circuit SDIC may be disposed to be integrated into the touch display panel 110. Each source driver integrated circuit SDIC may be implemented in the type of the chip on film COF type. In this case, each source driver integrated circuit SDIC may be mounted on a film connected to the touch display panel 110, and be electrically connected to the touch display panel 110 through lines on the film.

The controller 140 provides several control signals to the gate driving circuit 120 and the data driving circuit 130, and controls operations of the gate driving circuit 120 and the data driving circuit 130.

The controller 140 may be mounted on a printed circuit board (PCB), a flexible printed circuit (FPC), etc. and be electrically connected to the gate driving circuit 120 and the data driving circuit 130 through the printed circuit board (PCB), flexible printed circuit (FPC), etc.

The controller 140 enables the gate driving circuit 120 to output a scan signal according to a timing processed in each frame, converts image data input from external devices or image providing sources to a data signal format used in the data driving circuit 130, and then outputs image data resulted from the converting to the data driving circuit 130.

The controller 140 receives, in addition to the image data, several types of timing signals including a vertical synchronous signal VSYNC, a horizontal synchronous signal HSYNC, an input data enable signal DE, a clock signal CLK, etc. from other devices, networks, or systems (e.g. a host system).

The controller 140 may generate several types of control signals using the received timing signals from an outside source such as the host system, and output the generated signals to the gate driving circuit 120 and the data driving circuit 130.

For example, to control the gate driving circuit 120, the controller 140 outputs several types of gate control signals GCS including a gate start pulse GSP, a gate shift clock GSC, a gate output enable signal GOE, and the like.

Here, the gate start pulse GSP is used for controlling a start timing for operating one or more gate driver integrated circuits GDIC included in the gate driving circuit 120. The gate shift clock GSC is a clock signal commonly inputted to one or more gate driver integrated circuits GDIC, and is used for controlling a shift timing of a scan signal. The gate output enable signal GOE is used for indicating timing information of one or more gate driver integrated circuits GDIC.

Further, to control the data driving circuit 130, the controller 140 outputs several types of data control signals DCS including a source start pulse SSP, a source sampling clock SSC, a source output enable signal SOE, and the like.

Here, the source start pulse SSP is used for controlling a data sampling start timing of one or more source driver integrated circuits SDIC included in the data driving circuit 130. The source sampling clock SSC is a clock signal for controlling a sampling timing of data in each source driver integrated circuit SDIC. The source output enable signal SOE is used for controlling an output timing of the data driving circuit 130.

The touch display device 100 may supply several types of voltage or current to the touch display panel 110, the gate driving circuit 120, the data driving circuit 130, and the like, or may further include a power management integrated circuit for controlling the several types of voltage or current to be supplied.

Several circuit components may be disposed in each sub-pixel SP. For example, a liquid crystal or a light emitting element ED such as a light emitting diode may be disposed in the sub-pixel SP depending on types of touch display panels 110. Further, a pixel electrode to which a data voltage is applied and a common electrode to which a common voltage is applied may be disposed in each sub-pixel SP.

Further, the touch display device 100 may include sensors, lines, a driving circuit, and the like for sensing a touch of a user on the touch display panel 110.

For example, the touch display device 100 in accordance with embodiments of the present disclosure may include a plurality of touch electrodes TE located in the active area AA, a touch driving circuit 150 for driving touch electrodes TE, a plurality of routing lines TL for connecting the touch electrodes TE to the touch driving circuit 150. Further, the touch display device 100 may include a touch controller controlling the touch driving circuit 150 and sensing a touch based on signals detected by the touch driving circuit 150.

Each touch electrode TE may be, for example, a transparent electrode, or an opaque electrode whose at least a part is opened. When the touch electrode TE includes an opened part, the touch electrode TE may have a mesh pattern, and the opened part of the touch electrode TE may be overlapped with a light emitting area disposed in each sub-pixel SP.

One touch routing line TL may be connected to a plurality of touch electrodes TE, or at least one touch routing line TL may be connected to each touch electrode TE, depending on a structure in which the touch electrode TE is disposed and a touch sensing scheme.

In one embodiment, the plurality of touch electrodes TE may include a plurality of touch electrodes TE connected to one another in a X-axis direction and a plurality of touch electrodes TE connected to one another in a Y-axis direction. Further, a touch routing line TL may be arranged to be electrically connected to the touch electrodes TE connected to one another in the X-axis direction, and another touch routing line TL may be arranged to be electrically connected to the touch electrodes TE connected to one another in the Y-axis direction.

In this case, the touch electrodes TE may be disposed on an equal layer. Further, some touch electrodes TE may be connected to one another by a connection line arranged on an equal layer, the other touch electrodes TE may be connected to one another by a connection line arranged on another layer.

When sensing a touch, touch driving signals may be applied to a plurality of touch electrodes TE connected to one another in the X-axis or Y-axis direction, and touch sensing signals may be detected from a plurality of touch electrodes TE connected to one another in the Y-axis or X-axis direction. That is, when different signals are applied to the touch electrodes TE connected to one another in the X-axis direction and the touch electrodes TE connected to one another in the Y-axis direction, respectively, a touch can be sensed by detecting changes in mutual-capacitances between touch electrodes TE caused by the touch.

In another embodiment, the plurality of touch electrodes TE may be separated from one another and a touch routing line TL may be electrically connected to each touch electrode TE. Further, a touch can be sensed by detecting changes in self-capacitances caused by the touch.

In some instances, a mutual-capacitance based sensing and a self-capacitance based sensing may be performed in a structure in which the touch electrodes TE connected to one another in the X-axis direction and the touch electrodes TE connected to one another in the Y-axis direction are arranged.

The touch driving circuit 150 may output touch driving signals to the touch electrodes TE through the touch routing line TL, and detect touch sensing signals for the touch electrodes TE.

The touch driving circuit 150 may include an operational amplifier connected to the touch routing line TL to provide a touch driving signal and receive a touch sensing signal, and a feedback capacitor accumulating electric charges according to a signal received from the operational amplifier. Further, the touch driving circuit 150 may include an integrator processing an output signal from the operational amplifier, a sample and hold circuit, an analog to digital converter, and the like.

The touch driving circuit 150 may convert a touch sensing signal detected from the touch electrode TE to digital sensing data and transmit the resulted sensing data to the touch controller. The touch controller may detect the presence or absence of a touch and a touch coordinate based on the sensing data received from the touch driving circuit 150.

The touch driving circuit 150 may be located on the touch display panel 110 with being implemented as a separate circuit, and in some instances, be implemented as a circuit integrated with the data driving circuit 130, or the like.

Thus, in accordance with embodiments of the present disclosure, a touch of a user on the touch display panel 110 can be sensed by driving touch electrodes TE included in the touch display device 100. Further, the touch electrodes TE may be disposed on the touch display panel 110, or be disposed to be built into the touch display panel 110. Here, when the touch electrodes TE is disposed to be built into the touch display panel 110, a structure in which the touch electrodes TE are disposed may be different according to types of touch display devices 100.

In one embodiment, when the touch display device 100 is configured with a front emission structure, the touch electrode TE may be located on an encapsulation portion protecting a light emitting element such as a light emitting diode in the touch display panel 110. Alternatively, when the touch display device 100 is configured with a rear emission structure, the touch electrode TE may be located under the light emitting element.

Figure 2:
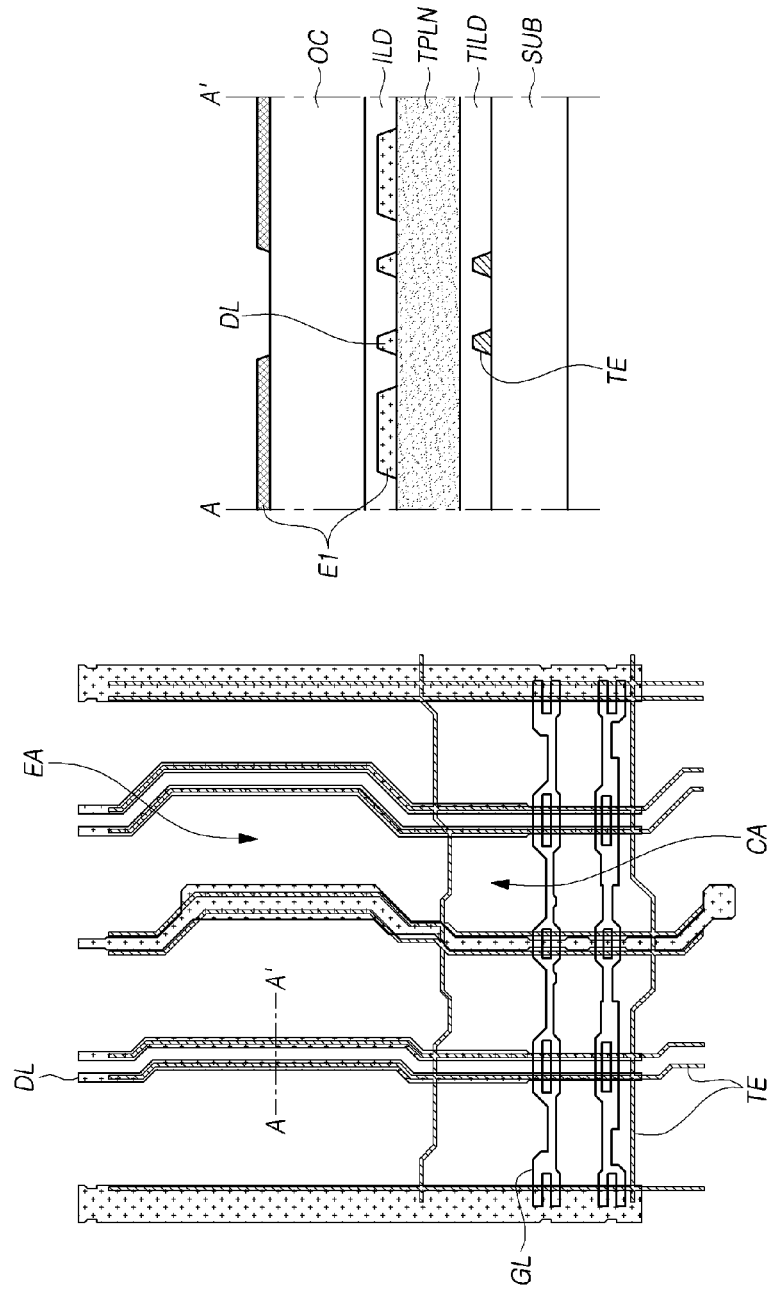
FIGS. 2 and 3 illustrate structures in which a touch electrode is disposed in the touch display device according to embodiments of the present disclosure.
Figure 3:
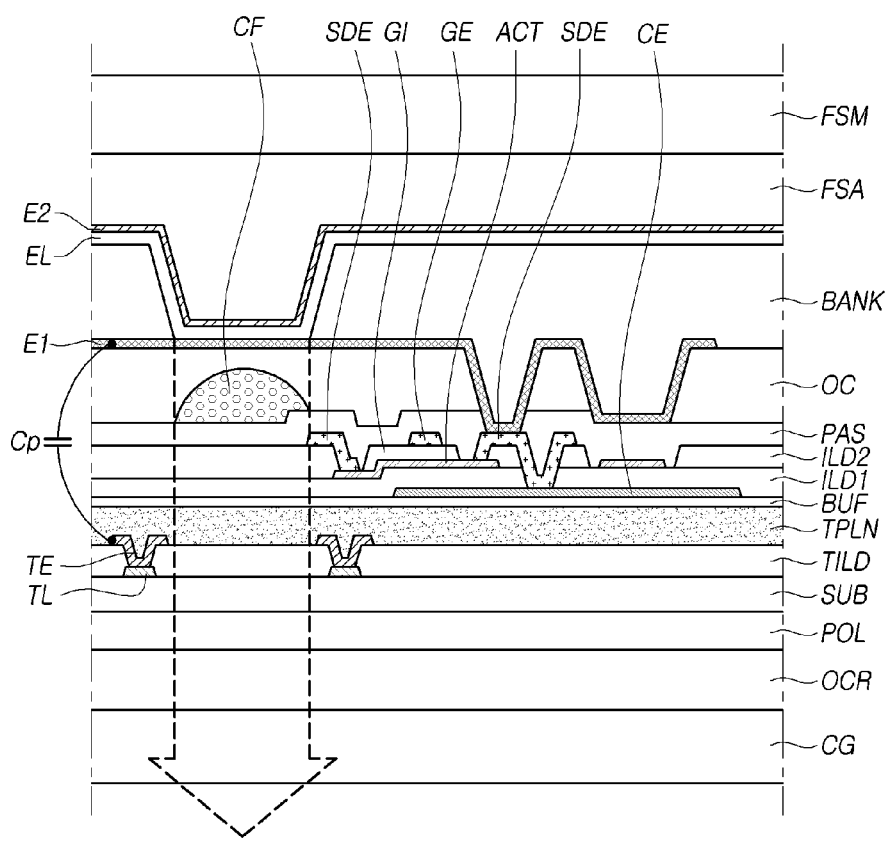

FIGS. 2 and 3 illustrate structures in which touch electrodes are disposed in the touch display device 100 when the touch display device 100 according to embodiments of the present disclosure has the rear emission structure. The right part in FIG. 2 is a cross section view taken along the A-A' line of the left part in FIG. 2.

Referring to FIG. 2, a touch electrode TE and a touch insulating layer TILD may be disposed on a substrate SUB of the touch display device 100. Here, since the touch display device 100 has the rear emission structure, the substrate SUB may be formed from a transparent material.

The touch insulating TILD may be located on the substrate SUB. When the touch electrode TE and a touch routing line TL are located on different layer from each other, the touch insulating layer TILD may be disposed between the touch electrode TE and the touch routing line TL.

A touch planarization layer TPLN may be disposed on the touch electrode TE and the touch insulating layer TILD.

The touch planarization layer TPLN may be disposed to have a predetermined thickness or more and provide a planarized top surface. Accordingly, in a structure in which the touch electrode TE is disposed on the substrate SUB, components for display driving may be easily disposed over the touch electrode TE.

One or more electrode(s) and one or more signal line(s) such as a data line DL and the like for display driving may be arranged on the touch planarization layer TPLN. An insulating layer ILD, an overcoat layer OC and the like may be disposed on the data line DL, and a first electrode E1 of a light emitting element may be disposed on the overcoat layer OC.

Here, the touch electrode TE may be disposed, for example, in an area overlapping with the signal line such as the data line DL, or the like. That is, the touch electrode TE may be disposed in an area except for a light emitting area EA and a circuit area CA included in a sub-pixel SP.

Further, the touch electrodes TE may be disposed in an area overlapping with one or more data line(s) DL or one or more other type of voltage line(s), and form a mesh pattern by being connected to one another in a direction intersecting the data line DL in the circuit area CA. In some instances, the touch electrode TE may be an electrode formed from a transparent material. In this case, the touch electrodes TE may be disposed in various structures.

Thus, by disposing the touch electrodes TE in an area overlapping with signal lines such as data lines DL or the like, and disposing the touch planarization layer TPLN on the touch electrodes TE, it is possible to provide a structure in which touch electrodes TE are built into the touch display device 100 with the rear emission structure.

FIG. 3 is a diagram illustrating more specifically a structure in which touch electrodes are disposed in the touch display device 100 with the rear emission structure according to embodiments of the present disclosure.

Referring to FIG. 3, since the touch display device 100 has the rear emission structure, a polarizing plate POL, an adhesive layer OCR, a cover glass CG, and the like may be located under a substrate SUB.

A touch routing line TL and a touch electrode TE may be arranged on the substrate SUB, and a touch insulating layer TILD may be located between the touch routing line TL and the touch electrode TE. A touch planarization layer TPLN may be disposed on the touch electrode TE and the touch insulating layer TILD.

Components for display driving may be disposed over the touch planarization layer TPLN.

In one embodiment, a buffer layer BUF may be disposed on the touch planarization layer TPLN, and a light blocking layer or a capacitor electrode CE may be disposed on the buffer layer BUF. A first insulating layer ILD1 may be disposed on the capacitor electrode CE, and a thin film transistor including an active layer ACT, a gate electrode GE and source and drain electrodes SDE may be disposed on the first insulating layer ILD1.

The thin film transistor may be a driving transistor for driving a light emitting element, or a switching transistor for controlling a scan signal provided to a sub-pixel SP.

A second insulating layer ILD2, a protective layer PAS, and the like may be disposed on the first insulating layer ILD1 and the thin film transistor. A part of the second insulating layer ILD2 may be disposed between a gate electrode GE and an active layer ACT of the thin film transistor and form a gate insulating layer GI.

An overcoat layer OC may be disposed on the protective layer PAS, and a first electrode E1 of a light emitting element such as a light emitting diode may be disposed on the overcoat layer OC.

Here, a color filter CF may be disposed between the protective layer PAS and the overcoat layer OC.

In one embodiment, when a light emitting element of a sub-pixel SP represents a specific color (e.g., white), to implement a color, the color filter CF may be disposed in a path through which light emitted from the light emitting element travels.

In this case, since a light emitting layer EL of the light emitting element emits light of a constant color, the color filter CF may be disposed as a whole on a plurality of sub-pixels SP. A second electrode E2 may be disposed on the light emitting layer EL. The light emitting area EA is defined by a bank BANK.

At this time, in order to increase efficiency in which light emitted from the light emitting element travels toward a rear surface of the substrate SUB, the second electrode E2 of the light emitting element may be formed from a material (e.g., Al) with a high reflectivity. Alternatively, a reflective electrode may be further disposed on the second electrode E2.

In another embodiment, a surface adhesive film FSA may be disposed on the second electrode E2, and a metal encapsulation substrate FSM may be disposed on the surface adhesive film FSA.

As shown in FIG. 3, by disposing the touch electrode TE and the touch routing line TL on the substrate SUB, disposing the planarization layer TPLN, and then, disposing the thin film transistor and the light emitting element, the touch electrode can be easily disposed in the display device with the rear emission structure.

Such a touch electrode TE may be driven in a period different from a period in which display driving is performed, or driven in the period in which the display driving is performed.

Figure 4A:
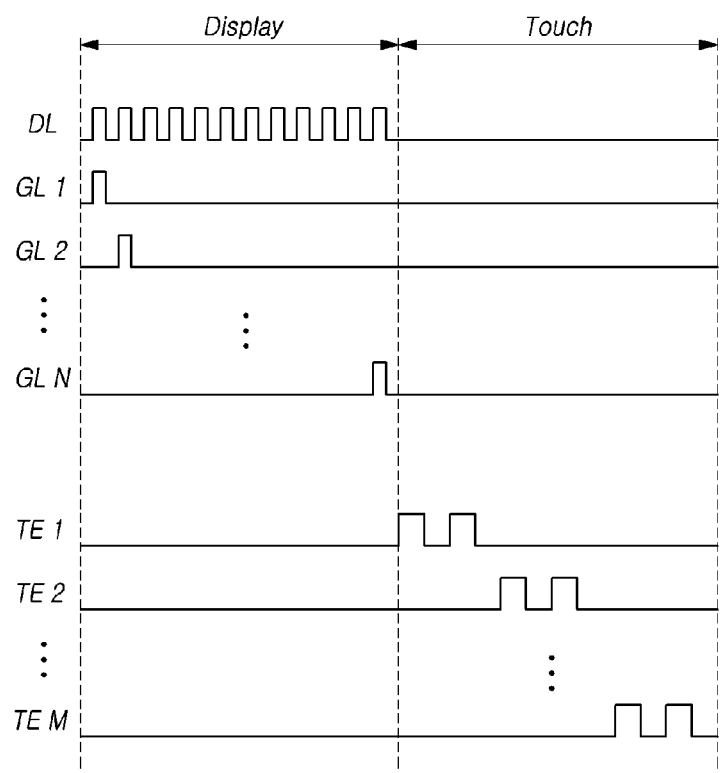
FIGS. 4A and 4B illustrate examples of driving schemes of the touch electrode illustrated in FIGS. 2 and 3 according to embodiments of the present disclosure.
Figure 4B:
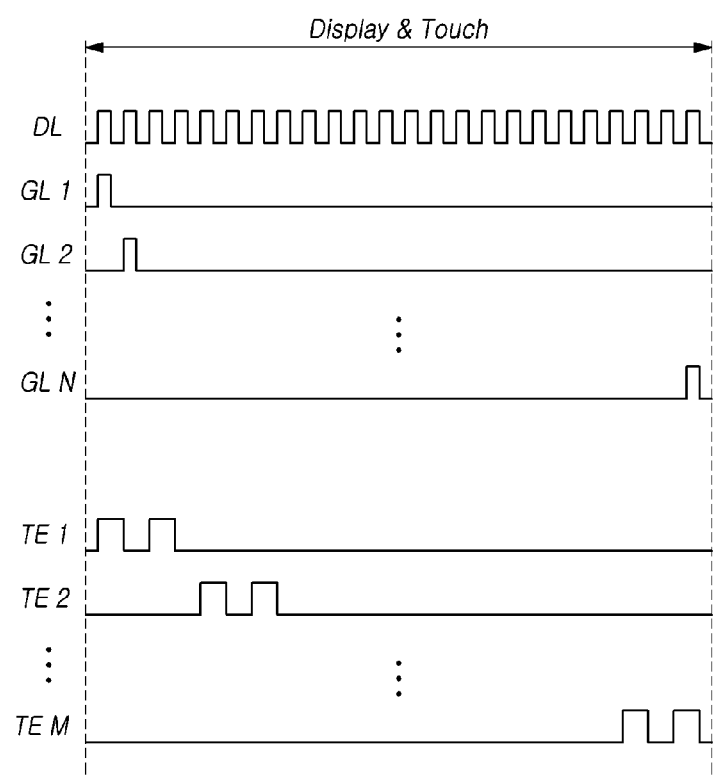

FIGS. 4A and 4B illustrate examples of driving schemes of the touch electrodes illustrated in FIGS. 2 and 3 according to embodiments of the present disclosure.

Referring to FIG. 4A, touch sensing may be performed in a period different from a period in which display driving is performed. The period in which the touch sensing is performed may be a blank period, such as a horizontal blank period or a vertical blank period, in a period of a frame which display driving is performed.

Thus, as touch sensing is performed in a period in which display driving is not performed among the frame period, it is possible to perform the touch sensing without affecting the display driving.

Alternatively, in some instances, display driving and sensing driving may be simultaneously or substantially simultaneously performed in at least a part of the frame period.

Referring to FIG. 4B, for display driving, gate lines GL 1 to GL N (N is a natural number greater than 1) may be sequentially driven and data lines DL may be driven according to driving timings of the gate lines GL.

Further, in a period in which display driving is performed, a touch driving signal may be provided to a touch electrode TE 1 to TE M (M is a natural number greater than 1), and as a result touch sensing may be performed.

Thus, a sufficient touch sensing period can be obtained by performing touch sensing together with display driving in at least an identical time. Accordingly, it is possible to improve performance of touch sensing by sufficiently obtaining touch sensing data generated based on touch sensing signals.

At this time, since display driving is performed in a period in which touch driving signal is provided to the touch electrode TE, a specific voltage or signal may be applied to an electrode or a signal line for the display driving. Accordingly, a parasite capacitance may be formed between the touch electrode TE and an electrode etc. for the display driving. For example, as shown in FIG. 3, a parasite capacitance Cp may be formed between touch electrode TE and the first electrode E1 of the light emitting element.

A current flowing through the first electrode E1 of the light emitting element may continually vary depending on display driving. In a state where a parasitic capacitance Cp has been formed between the touch electrode TE and the first electrode E1 of the light emitting element, since a signal applied to the first electrode E1 continually varies, there is a possibility that some noises may occur in touch sensing signals detected from the touch electrodes TE. The performance of touch sensing may be deteriorated due to such noises.

Figure 5:
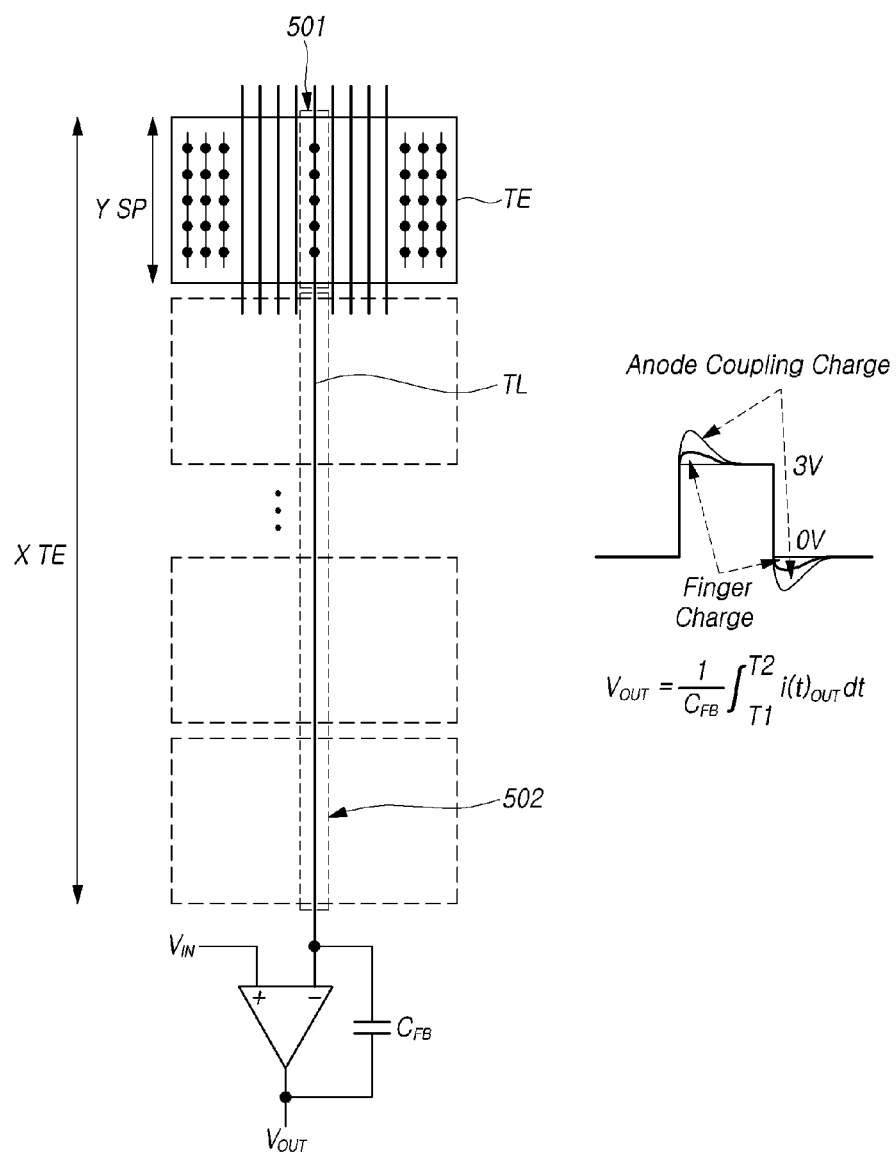
FIG. 5 illustrates an effect resulting from display driving when a touch is sensed.

FIG. 5 illustrates an effect resulted from display driving when a touch is sensed.

Referring to FIG. 5, a touch routing line TL may be electrically connected to an operational amplifier disposed in a touch driving circuit 150. The touch routing line TL may be electrically connected to one of a plurality of touch electrodes TE disposed in a touch display panel 110.

Here, one touch electrode TE may be disposed in an area overlapping with a plurality of sub-pixel SP. In one embodiment, a touch electrode TE may overlap with one or more columns of sub-pixels Y SP disposed in Y rows. Accordingly, a signal detected from the touch electrode TE may vary in line with a variation of a voltage or a current of a first electrode E1 of a light emitting element disposed in a sub-pixel SP overlapping with the touch electrode TE. Further, since an amount of capacitances varied in line with the first electrode E1 of the light emitting element may be greater than an amount of capacitances varied by a finger touch, thus, the performance of touch sensing may be deteriorated.

Further, even when a sub-pixel does not overlap with the touch electrode TE, display noises may occur by the driving of the sub-pixel SP disposed in an area overlapping with the touch routing line TL detecting a signal from the touch electrode TE.

That is, in one example, when the touch routing line TL is electrically connected to an Xth touch electrode of X TE, the touch routing line TL is electrically connected to the touch electrode TE in an area 501. Accordingly, display noises may occur by the driving of a sub-pixel SP overlapping with a corresponding touch electrode TE in the area 501.

Further, as the touch routing line TL electrically connected to the touch electrode TE is connected to the touch driving circuit 150, the touch routing line TL may be disposed to overlap with an area 502. Accordingly, display noises may occur by the driving of a sub-pixel SP overlapping with the area 502.

For example, $V_{IN}$ is the touch driving signal. And $V_{OUT}$ is the touch sensing signal. $C_{FB}$ is a feedback capacitor to store a charge acquired through the touch line TL.

$V_{IN}$ may be applied to the touch electrode TE by the touch line TL for sensing a touch. If the touch is occurred, a charge may be stored in the $C_{FB}$. $V_{OUT}$ may be calculated by integrating a current $i(t)_{OUT}$ by the charge from a timing T1 to a timing T2.

At this time, for the accurate touch sensing, only finger charge should be detected. But an anode coupling charge may be occurred by the display noise according to the coupling between the touch electrode TE and an anode disposed in the subpixel SP overlapped with the touch electrode TE. And the anode coupling charge may reduce an accuracy of the touch sensing.

Thus, when touch sensing and display driving are simultaneously performed, the performance of touch sensing may be deteriorated by noises caused by the display driving.

In accordance with embodiments of the present disclosure, in a structure in which a touch electrode TE is located below a thin film transistor and a light emitting element, a method is provided for reducing noises related to a touch sensing signal caused by display driving by disposing a shielding electrode SE over the touch electrode TE.

Figure 6:
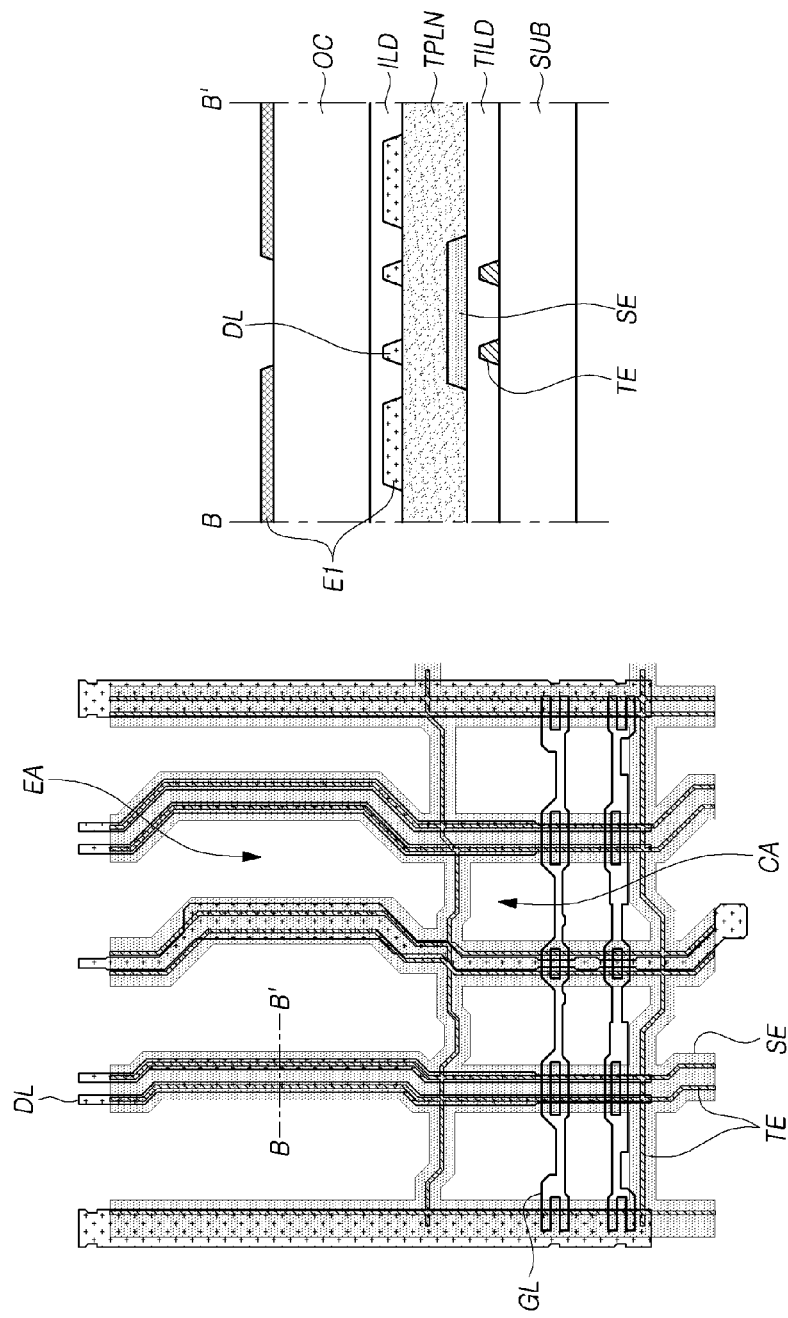
FIGS. 6 and 7 illustrate examples of structures in which a touch electrode and a shielding electrode are disposed in the touch display device according to some embodiments of the present disclosure.
Figure 7:
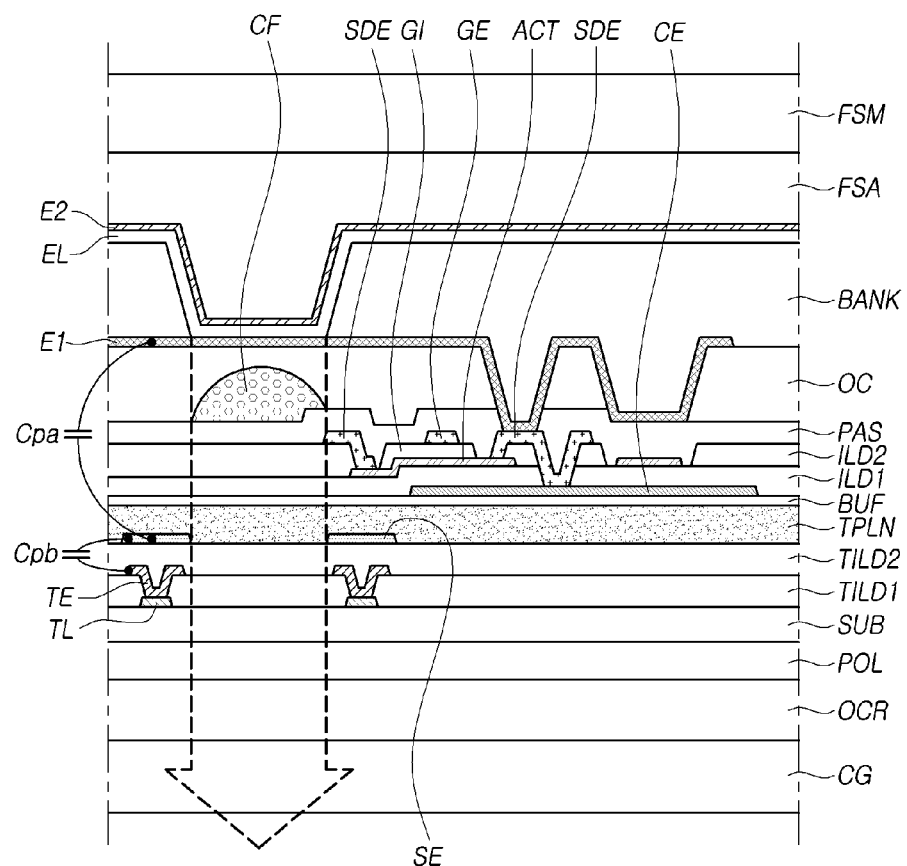

FIGS. 6 and 7 illustrate structures in which a touch electrode TE and a shielding electrode SE are disposed in the touch display device 100 according to some embodiments of the present disclosure. The right part in FIG. 6 is a cross section view taken along the B-B' line of the left part in FIG. 6.

Referring to FIG. 6, a touch electrode TE and a touch insulating layer TILD are disposed on a substrate SUB. A touch planarization layer TPLN may be disposed on the touch electrode TE and the touch insulating layer TILD. A data line DL and a first electrode E1 of a light emitting element, and the like may be disposed on the touch planarization layer TPLN.

Here, a shielding electrode SE may be disposed between the touch electrode TE and the touch insulating layer TILD and the touch planarization layer TPLN.

The shielding electrode SE may be disposed in an area including an area overlapping the touch electrode TE. Further, the shielding electrode SE may be disposed in a shape in which one or more touch electrode(s) TE are disposed.

For example, as shown in FIG. 6, the shielding electrode SE may be disposed in an area except for an area overlapping with a light emitting area EA in a sub-pixel SP. Further, the shielding electrode SE may be disposed to overlap with one or more touch electrode(s) TE.

Accordingly, at least a part of the shielding electrode SE may be disposed in an area overlapping with a signal line, such as the data line DL, or the like. Further, at least a part of the shielding electrode SE may be disposed in a direction intersecting the data line in a circuit area CA of a sub-pixel SP, and overlap with the touch electrode TE. In some instances, the shielding electrode SE may be formed from a transparent material. In this case, the shielding electrodes SE may be disposed in more various structures. That is, the shielding electrode SE may be formed from a transparent material or an opaque material so that the shielding electrode SE can be disposed depending on a structure in which one or more touch electrodes are disposed.

In a structure in which the touch electrode TE is disposed on the substrate SUB, since the shielding electrode SE is disposed between the touch electrode TE and a light emitting element, noises resulted from voltage or current variances caused by display driving can be prevented by the shielding electrode SE.

FIG. 7 is a diagram illustrating more specifically the structure in which the touch electrode TE and the shielding electrode SE are disposed as illustrated in FIG. 6.

Referring to FIG. 7, a touch electrode TE and a touch routing line TL may be disposed on a substrate SUB. A first touch insulating layer TILD1 may be disposed between the touch electrode TE and the touch routing line TL, and a second touch insulating layer TILD2 may be disposed on the touch electrode TE. Here, in some instances, disposed locations of the touch electrode TE and the touch routing line TL may be interchanged.

A shielding electrode SE may be disposed in an area including an area overlapping the touch electrode TE on the second touch insulating layer TILD2. A touch planarization layer TPLN may be disposed on the shielding electrode SE.

A thin film transistor, a light emitting element, and the like for display driving may be disposed over the touch planarization layer TPLN.

Since the shielding electrode SE is disposed between the touch electrode TE and the light emitting element etc. and disposed in the area including the area overlapping the touch electrode TE, it is possible to prevent the touch electrode TE from being affected by signal variances caused by the driving of the light emitting element etc.

For example, since the shielding electrode SE is disposed on the touch electrode TE, a parasitic capacitance Cpa may be formed between a first electrode of the light emitting element and the shielding electrode SE. Further, a parasitic capacitance may not be formed between the first electrode of the light emitting element and the touch electrode TE.

Accordingly, even when a signal variance of the first electrode E1 of the light emitting element occurs according to display driving, it is possible to prevent the occurring of a noise in a signal detected from the touch electrode TE by the signal variance of the first electrode E1. The first electrode E1 may be an anode electrode, and the second electrode E2 may be a cathode electrode.

That is, due to the disposing of the shielding electrode SE, it is possible to prevent a signal variance of the first electrode E1 of the light emitting element from acting as a direct noise to the touch electrode TE.

Further, even which the parasitic capacitance Cpb is formed between the shielding electrode SE and the touch electrode TE, since a direct noise caused by display driving can be prevented, it is possible to reduce a noise of a touch sensing signal caused by the display driving.

Here, depending on driving schemes of the shielding electrode SE, it is possible to prevent an indirect noise caused by the parasitic capacitance Cpb is formed between the shielding electrode SE and the touch electrode TE.

Figure 8A:
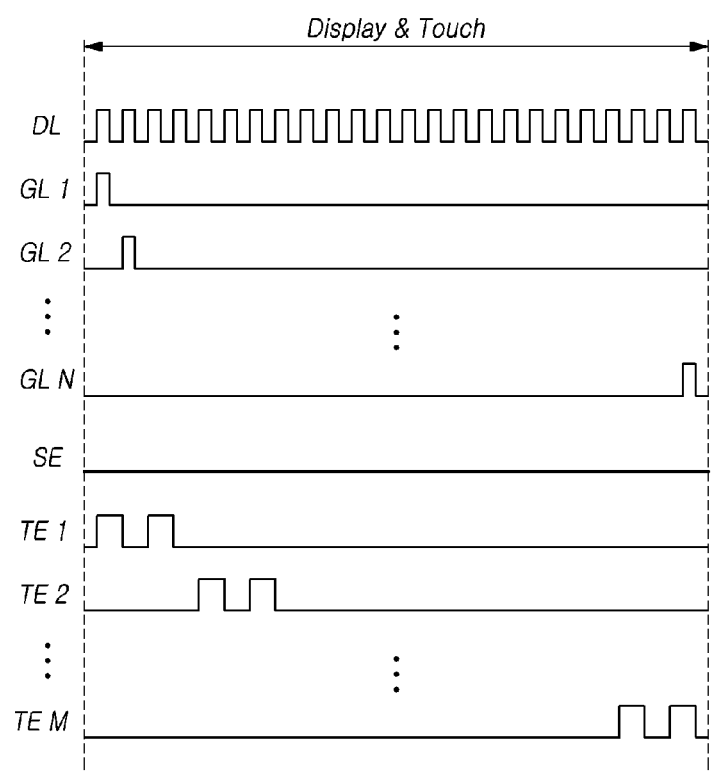
FIGS. 8A and 8B illustrate examples of driving schemes of the touch electrode and the shielding electrode illustrated in FIGS. 6 and 7 according to embodiments of the present disclosure.
Figure 8B:
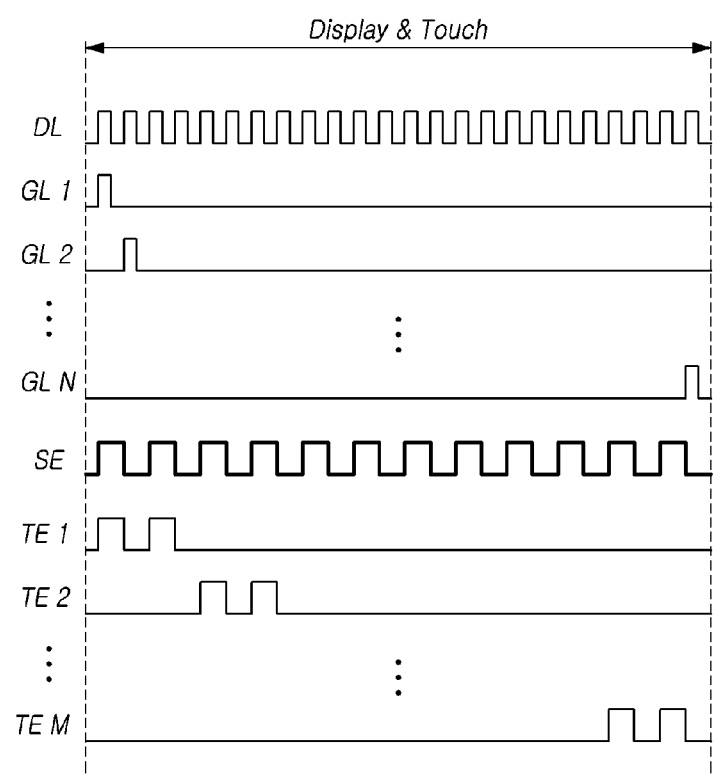

FIGS. 8A and 8B illustrate examples of driving schemes of the touch electrode TE and the shielding electrode SE illustrated in FIGS. 6 and 7 according to embodiments of the present disclosure.

Referring to FIG. 8A, touch sensing and display driving may be simultaneously performed. A plurality of gate lines GL is sequentially driven, a data voltage may be provided to a sub-pixel SP according to the driving of the gate lines GL.

Further, in a period in which display driving is performed, a touch driving signal may be provided to a touch electrode TE, and as a result touch sensing may be performed.

In the period in which a touch driving signal is provided to the touch electrode TE, a shielding signal of a constant voltage may be provided to a shielding electrode SE. The voltage provided to the shielding electrode SE may be a voltage with a small electric potential difference from the touch driving signal, for example, a voltage of 0V; however, embodiments of the present disclosure are not limited thereto.

In a period in which touch sensing is performed, by providing a constant voltage to the shielding electrode SE, it is possible to prevent the touch electrode TE from being affected by noises caused by the display driving. Accordingly, touch sensing can be performed regardless of the display driving, leading the performance of the touch sensing to be improved.

A circuit for providing a shielding signal to such a shielding electrode SE may be a separate circuit from the touch driving circuit 150. In another example, a shielding signal may be provided through a channel allocated by the touch driving circuit 150.

In some instances, the shielding signal provided to the shielding electrode SE may be a signal corresponding to a touch driving signal provided to the touch electrode TE. By providing a shielding signal corresponding to a touch driving signal to a shielding electrode SE, it is possible to reduce the occurring of an indirect noise caused by the display driving due to a parasitic capacitance between the touch electrode TE and the shielding electrode SE.

Referring to FIG. 8B, in a period in which display driving is performed, a touch driving signal may be provided to a touch electrode TE. Further, in the period in which a touch driving signal is provided to the touch electrode TE, a shielding signal may be provided to a shielding electrode SE.

Here, the shielding signal may be a signal corresponding to the touch driving signal. For example, at least one of a frequency, a phase, and an amplitude of the shielding signal may be equal to at least one of a frequency, a phase, and an amplitude of the touch driving signal.

Since a shielding signal equal to a touch driving signal provided to the touch electrode TE is provided to the shielding electrode SE, a parasitic capacitance may not be formed between the touch electrode TE and the shielding electrode SE. Even when a signal level of a shielding electrode SE varies according to display driving, a parasitic capacitance may not be formed between the shielding electrode SE and a touch electrode TE; therefore, signal variances of the touch electrode TE may not occur according to signal variances of the shielding electrode SE.

Thus, by disposing a shielding electrode SE between the touch electrode TE and a light emitting element etc., a direct noise caused by display driving can be prevented, and by driving, with an equal signal, the touch electrode TE and the shielding electrode SE, an effect of blocking display noises can be maximized.

Further, at least a part of the shielding electrode SE may be located on a side of the touch electrode TE so that a parasitic capacitance that may be formed in an inclination direction (i.e. a direction sloping at a certain angle to the horizontal) can be reduced, as well as a parasitic capacitance formed in the vertical direction between a touch electrode TE and a first electrode E1 of a light emitting element.

Figure 9:
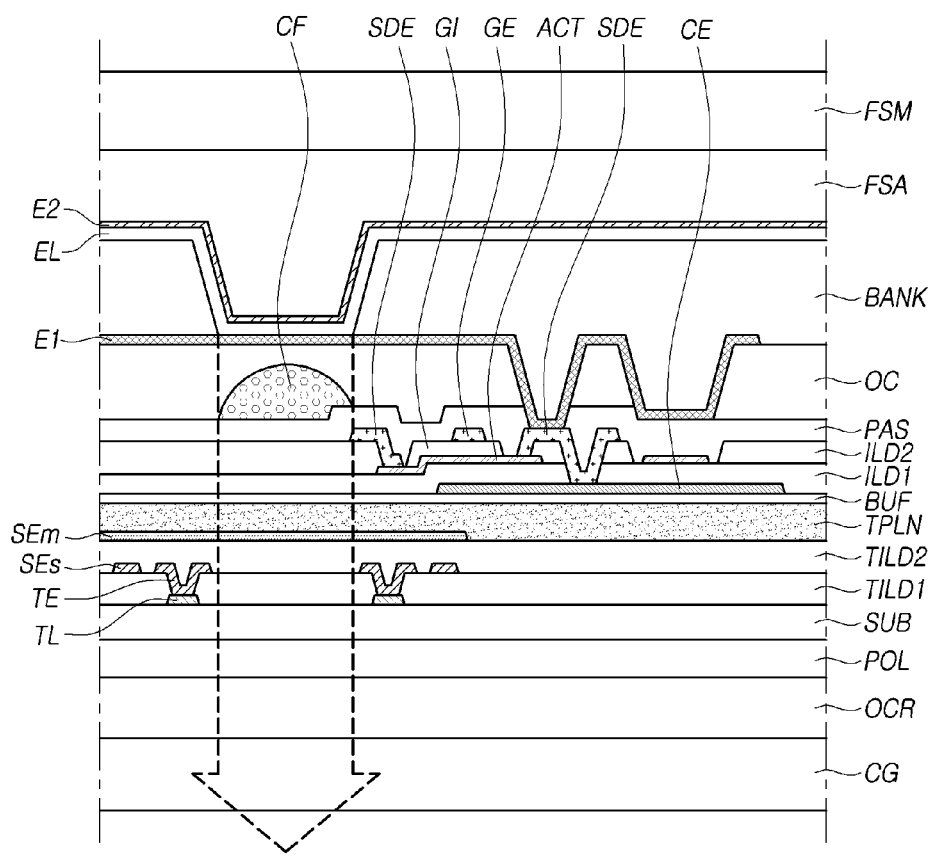
FIGS. 9 to 11 illustrate examples of structures in which a touch electrode and a shielding electrode are disposed in the touch display device according to some embodiments of the present disclosure.
Figure 10:
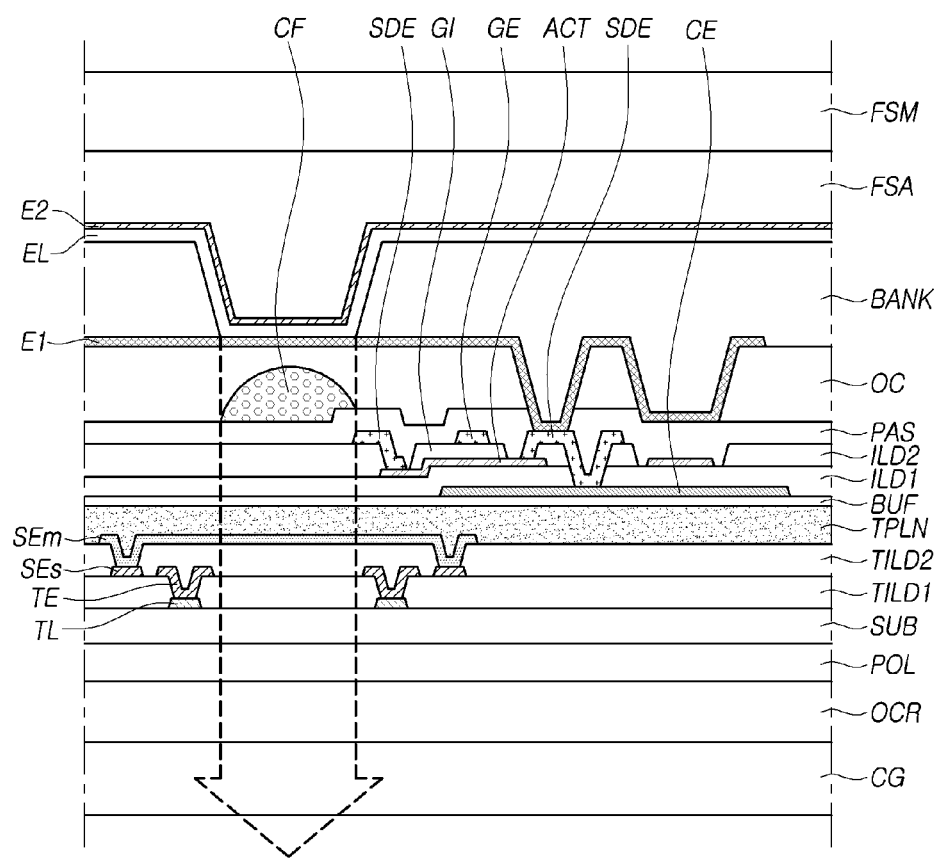
Figure 11:
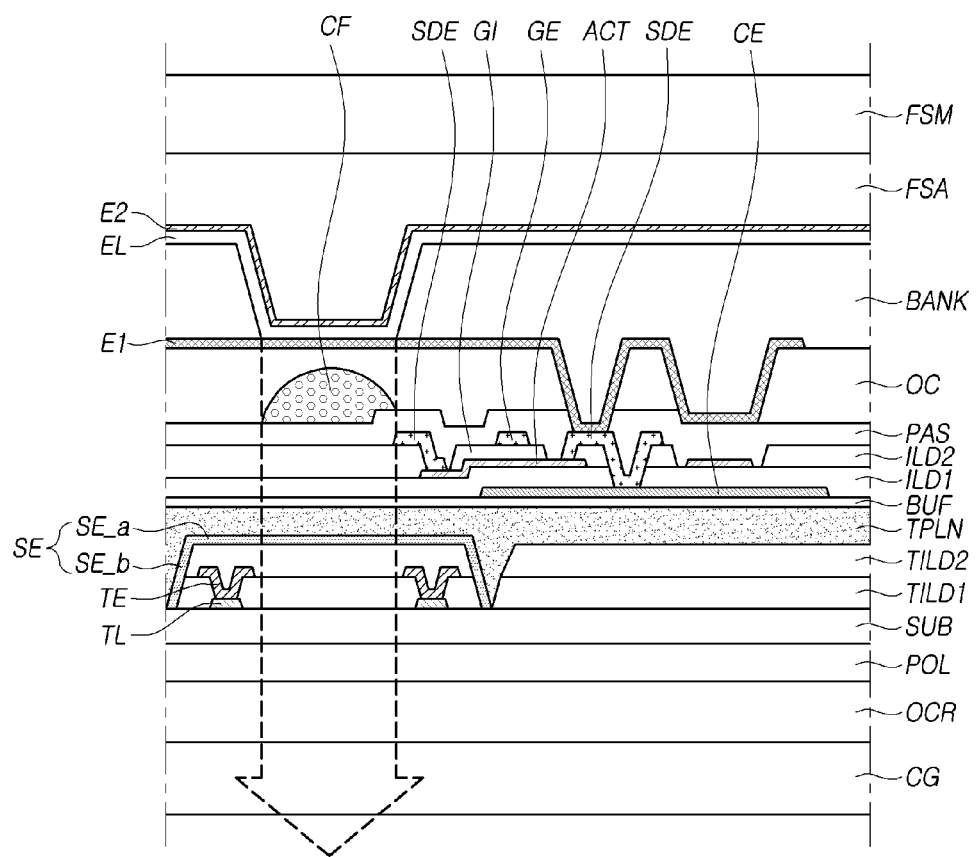

FIGS. 9 to 11 illustrate structures in which a touch electrode TE and a shielding electrode SE are disposed in the touch display device 100 according to some embodiments of the present disclosure.

Referring to FIG. 9, a touch routing line TL and a touch electrode TE may be disposed on a substrate SUB. A first touch insulating layer TILD1 may be disposed between the touch routing line TL and the touch electrode TE, and a second touch insulating layer TILD2 may be disposed on the touch electrode TE.

A touch planarization layer TPLN may be disposed on the second touch insulating layer TILD2, and a thin film transistor, a light emitting element, and the like may be disposed on the touch planarization layer TPLN.

Here, a main shielding electrode SEm may be disposed in an area including an area overlapping with the touch electrode TE between the second touch insulating layer TILD2 and the touch planarization layer TPLN. Further, at least one sub shielding electrode SEs may be disposed in an area spaced apart from a side portion of the touch electrode TE.

The sub shielding electrode SEs may be disposed in an equal layer to the touch electrode TE, or disposed in an equal layer to the touch routing line TL. In another example, all of one or more sub shielding electrodes SEs may be disposed in an area in which the touch electrode TE and the touch routing line TL are disposed. That is, the sub shielding electrode SEs may be formed from an equal material to the touch electrode TE or the touch routing line TL.

Since the sub shielding electrode SEs is disposed in the area spaced apart from the side portion of the touch electrode TE, it is possible to prevent the forming of a parasitic capacitance in an inclination direction to a first electrode E1 of a light emitting element or a signal line located on the touch electrode TE.

Further, a signal equal to a shielding signal provided to the main shielding electrode SEm may be provided to the sub shielding electrode SEs.

Accordingly, in a period in which a touch driving signal is provided to the touch electrode TE, a constant voltage or a signal corresponding to the touch driving signal may be provided to the sub shielding electrode SEs.

Since the sub shielding electrode SEs is disposed on the side of the touch electrode TE, it is possible to prevent the forming of a parasitic capacitance in an inclination direction between the touch electrode TE and a first electrode E1 of a light emitting element etc. Further, since a signal corresponding to a touch driving signal is provided to the sub shielding electrode SEs, it is possible to prevent the occurring of an indirect noise in a touch sensing signal due to a signal variance of the sub shielding electrode SEs caused by display driving.

As shown in FIG. 9, such a sub shielding electrode SEs may be disposed in a structure in which the sub shielding electrode SEs is separated from the main shielding electrode SEm, but, in some instances, may be disposed in a structure in which the sub shielding electrode SEs is electrically connected to the main shielding electrode SEm.

Referring to FIG. 10, a main shielding electrode SEm may be disposed between a second touch insulating layer TILD2 and a touch planarization layer TPLN. Further, the main shielding electrode SEm may be disposed in an area including an area overlapping a touch electrode TE.

A sub shielding electrode SEs may be disposed in an area spaced apart from a side portion of the touch electrode TE or a touch routing line TL.

For example, the sub shielding electrode SEs may be disposed to be spaced apart from a side portion of the touch electrode TE between a first touch insulating layer TILD1 and the second touch insulating layer TILD2. In another example, the sub shielding electrode SEs may be disposed to be spaced apart from a side portion of the touch routing line TL on the substrate SUB.

This sub shielding electrode SEs may be electrically connected to the main shielding electrode SEm disposed on the second touch insulating layer TILD2.

That is, as illustrated in FIG. 10, the sub shielding electrode SEs may be electrically connected to the main shielding electrode SEm through a contact hole formed in the second touch insulating layer TILD2. In another example, when the sub shielding electrode SEs is disposed between a substrate SUB and the first touch insulating layer TILD1, the sub shielding electrode SEs may be electrically connected to the main shielding electrode SEm through a contact hole formed in the first touch insulating layer TILD1 and the second touch insulating layer TILD2.

As the sub shielding electrode SEs is disposed on a side of at least one of the touch electrode TE and the touch routing line TL, it is possible to prevent the forming of a parasitic capacitance in an inclination direction.

Further, as the sub shielding electrode SEs is electrically connected to the main shielding electrode SEm, it is possible to provide an advantage that does not need a separate configuration for providing a signal to the sub shielding electrode SEs.

Thus, by disposing the sub shielding electrode SEs including a material equal to the touch electrode TE or the touch routing line TL, in addition to the main shielding electrode SEm disposed over the touch electrode TE, it is possible to increase an effect of preventing noises.

Further, in some instances, by forming the shielding electrode SE disposed over the touch electrode TE in a structure of surrounding at least one side of the touch electrode TE, it is possible to improve an effect of preventing noises.

Referring to FIG. 11, a touch routing line TL and a touch electrode TE may be disposed on a substrate SUB. A first touch insulating layer TILD1 may be disposed between the touch routing line TL and the touch electrode TE, and a second touch insulating layer TILD2 may be disposed on the touch electrode TE.

A shielding electrode SE may be disposed on the second touch insulating layer TILD2, and a planarization layer TPLN may be disposed on the shielding electrode SE.

Here, at least a part of the second touch insulating layer TILD2 may have an etched structure. In another example, at least parts of the first touch insulating layer TILD1 and the second touch insulating layer TILD2 may have etched structures.

The shielding electrode SE may include a first part SE_a disposed on the second touch insulating layer TILD2 and disposed in an area including at least a part of an area overlapping the touch electrode TE, and a second part SE_b extending from the first part SE_a and disposed to be spaced apart from a side portion of at least one of the touch electrode TE and the touch routing line TL.

The second part SE_b of the shielding electrode SE may be disposed in etched areas of the first touch insulating layer TILD1 and the second touch insulating layer TILD2. Further, a lower portion of the second part SE_b of the shielding electrode SE may be located under at least one of the touch electrode TE and the touch routing line TL.

As the shielding electrode SE is disposed in a structure extending to a side portion of the touch electrode TE while being located on the touch electrode TE, it is possible to prevent the forming of a parasitic capacitance in an inclination direction or a vertical direction, between the touch electrode TE and a first electrode E1 of a light emitting element. In particular, by locating the lower portion of the second part SE_b of the shielding electrode SE under at least one of the touch electrode TE and the touch routing line TL, it is possible further to increase an effect of preventing the forming of a parasitic capacitance in an inclination direction.

Further, even when the shielding electrode SE is disposed in an area formed by etching at least parts of the first touch insulating layer TILD1 and the second touch insulating layer TILD2, the disposing of the touch planarization layer TPLN on the shielding electrode SE may not affect the disposing of a thin film transistor, a light emitting element, and the like on the touch planarization layer TPLN.

Accordingly, in the touch display device with the rear emission structure, it is possible to improve the performance of touch sensing through the disposing of the shielding electrode SE, while performing a touch sensing function.

Thus, the shielding electrode SE can receive a shielding signal, such as a constant voltage or a signal corresponding to a touch driving signal, while preventing a direct noise between a touch electrode TE and a first electrode E1 of a light emitting element; therefore, it is possible to increase an effect of preventing noises.

Further, driving schemes of a shielding electrode SE may be variously implemented according to disposed structures or driving schemes of a touch electrode TE.

For example, when a shielding electrode SE is disposed across the entire of an active area AA and overlapped with all touch electrodes TE, a shielding signal may be provided to the shielding electrode SE at a period in which a touch driving signal is applied to the touch electrode TE.

In another example, when a shielding electrode SE is disposed to be overlapped with a part of the plurality of touch electrodes TE, a shielding signal may be provided to the shielding electrode SE in line with a driving timing of the part of the plurality of a touch electrode TE overlapped with the shielding electrode SE.

Figure 12:
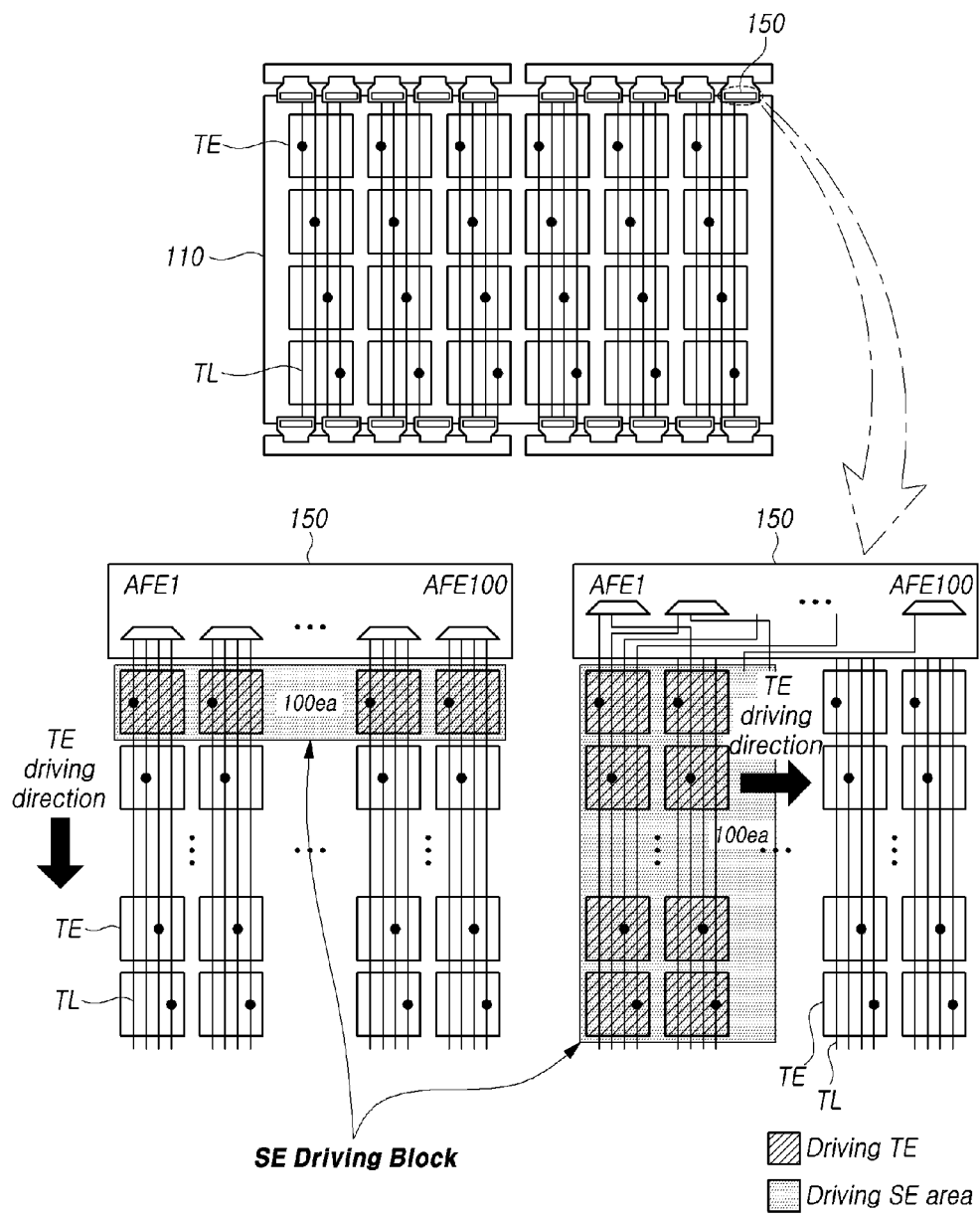
FIG. 12 illustrates a driving scheme of a touch electrode and a shielding electrode according to a structure in which the shielding electrode is disposed according to one embodiment of the present disclosure.

FIG. 12 illustrates a driving scheme of a touch electrode TE and a shielding electrode SE according to a structure in which the shielding electrode SE is disposed according to one embodiment of the present disclosure.

Referring to FIG. 12, a shielding electrode disposed on a touch electrode TE may be disposed to correspond to two or more touch electrodes TE. Further, the shielding electrode SE may be disposed to correspond to one or more rows or one or more columns of touch electrodes TE. That is, the shielding electrode SE may be disposed to correspond to a row or a column of the touch electrodes according to a driving direction of touch electrodes TE.

For example, when the touch electrodes TE are sequentially driven along a direction in which a touch routing line TL is disposed, the shielding electrode SE may be disposed in a direction intersecting the touch routing line TL, and disposed to correspond to one or more rows of the touch electrodes TE.

One or more shielding electrodes SE corresponding to one or more rows of the touch electrodes TE may be sequentially driven according to the driving of the touch electrodes TE. In this situation, each analog front end included in the touch driving circuit 150 may sequentially drive touch electrodes TE disposed in an equal column.

That is, when 100 analog front ends AFE1 to AFE100 are disposed in the touch driving circuit 150, 100 touch electrodes disposed in an equal row are driven, and a shielding electrode SE corresponding to the 100 touch electrodes may be driven.

In this situation, a shielding electrode SE overlapping with a touch routing line TL electrically connected to driven touch electrodes TE may be further driven. In order to increase an effect of preventing display noises caused by the driving of sub-pixels overlapping with the touch routing line TL through which touch sensing signals are detected from the driven touch electrodes TE, a shielding signal may be provided up to the shielding electrode SE overlapping with the touch routing line TL.

Further, by sequentially driving touch electrodes TE along a direction intersecting a direction in which the touch routing line TL is disposed, it is possible to reduce noises caused by the driving of the sub-pixels overlapping the touch routing line TL.

For example, a shielding electrode SE is disposed to correspond to one or more columns of touch electrodes TE, and the touch electrodes may be driven on a one or more column basis. That is, the touch electrodes may be sequentially driven in a direction intersecting a touch routing line TL.

As described above, when 100 analog front ends AFE1 to AFE100 are disposed, 100 touch electrodes included in one or more columns are sequentially driven, and the shielding electrode SE corresponding to the touch electrodes TE may be driven.

Since touch electrodes TE overlapping with the touch routing line TL are simultaneously driven, and the shielding electrode SE corresponding to driven touch electrodes TE are driven, noises caused by the driving of sub-pixels overlapping with the touch routing line TL electrically connected to the driven touch electrodes TE may be reduced by the shielding electrode SE.

Thus, since the shielding electrode SE is disposed in various patterns along a direction in which the touch electrodes TE are driven, and is driven in line with driving timings of the touch electrodes TE, it is possible effectively to reduce noises caused by display driving when touch sensing is performed.

Further, in some instances, shielding electrodes SE may be disposed to correspond to respective touch electrodes TE.

Figure 13:
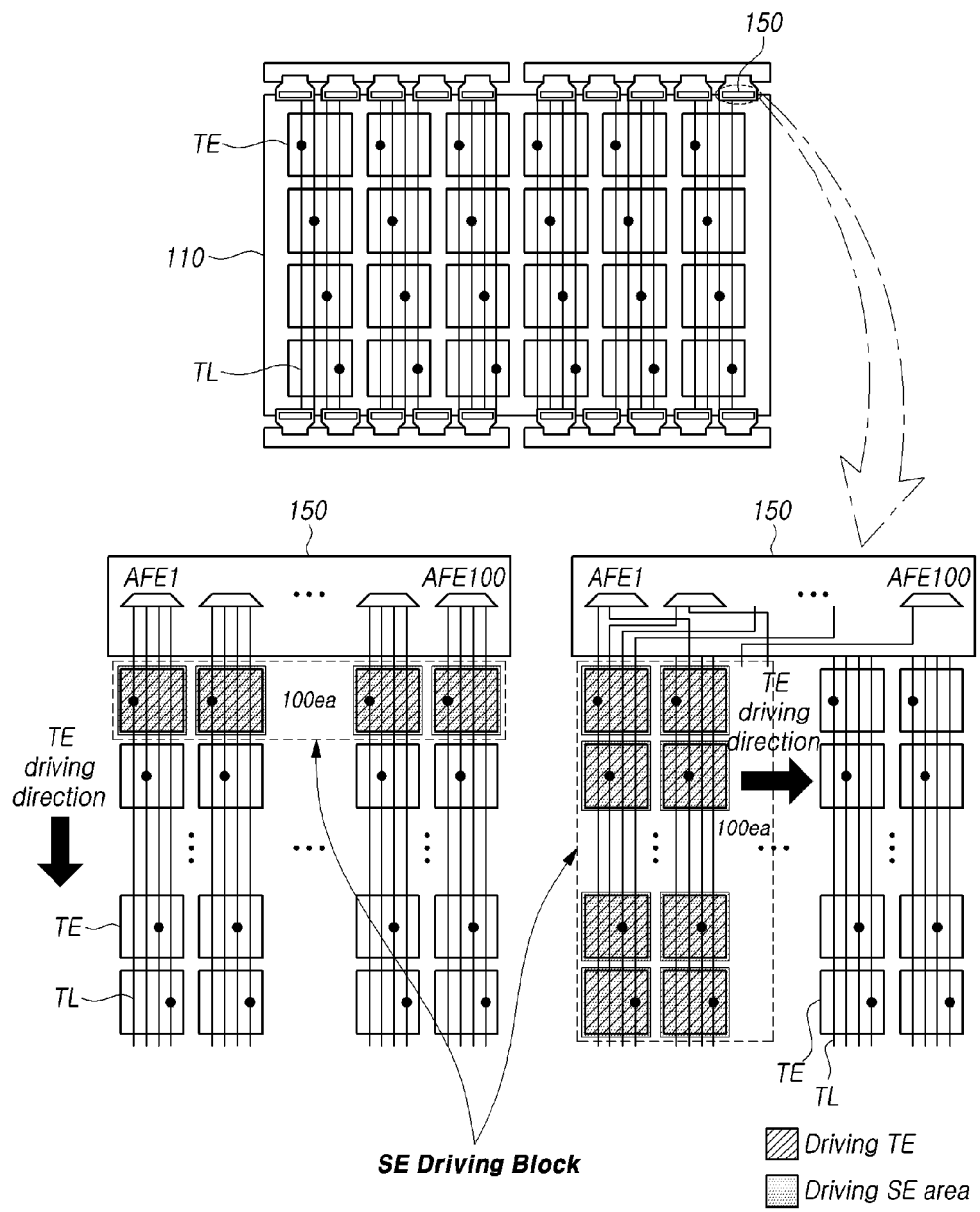
FIG. 13 illustrates a driving scheme of a touch electrode and a shielding electrode according to a structure in which the shielding electrode is disposed according to another embodiment of the present disclosure.

FIG. 13 illustrates a driving scheme of a touch electrode TE and a shielding electrode SE according to a structure in which the shielding electrode SE is disposed according to another embodiment of the present disclosure.

Referring to FIG. 13, a shielding electrode SE disposed on a touch electrode TE may be disposed to correspond to each touch electrode TE. Even when the shielding electrode SE is disposed to correspond to each touch electrode TE, the shielding electrode SE may be driven in line with a driving scheme of the touch electrode TE.

For example, when touch electrodes TE are sequentially driven along a direction in which a touch routing line TL is disposed, the shielding electrodes SE may be also sequentially driven along the direction in which the touch routing line TL is disposed. In this situation, a shielding electrode SE overlapping with a touch routing line TL electrically connected to driven touch electrodes TE may be further driven.

In another example, when touch electrodes TE are sequentially driven along a direction intersecting a direction in which a touch routing line TL is disposed, the shielding electrode SE may be also sequentially driven along the direction intersecting the direction in which the touch routing line TL is disposed.

Further, since the shielding electrodes SE are disposed to correspond to respective touch electrodes TE, even when one or more touch electrodes TE disposed in a partial area are selectively driven without sequentially driving the touch electrodes TE on a column or a row basis, it is possible effectively to reduce noises caused by the display driving by means of the driving of the shielding electrodes SE.

Figure 14A:
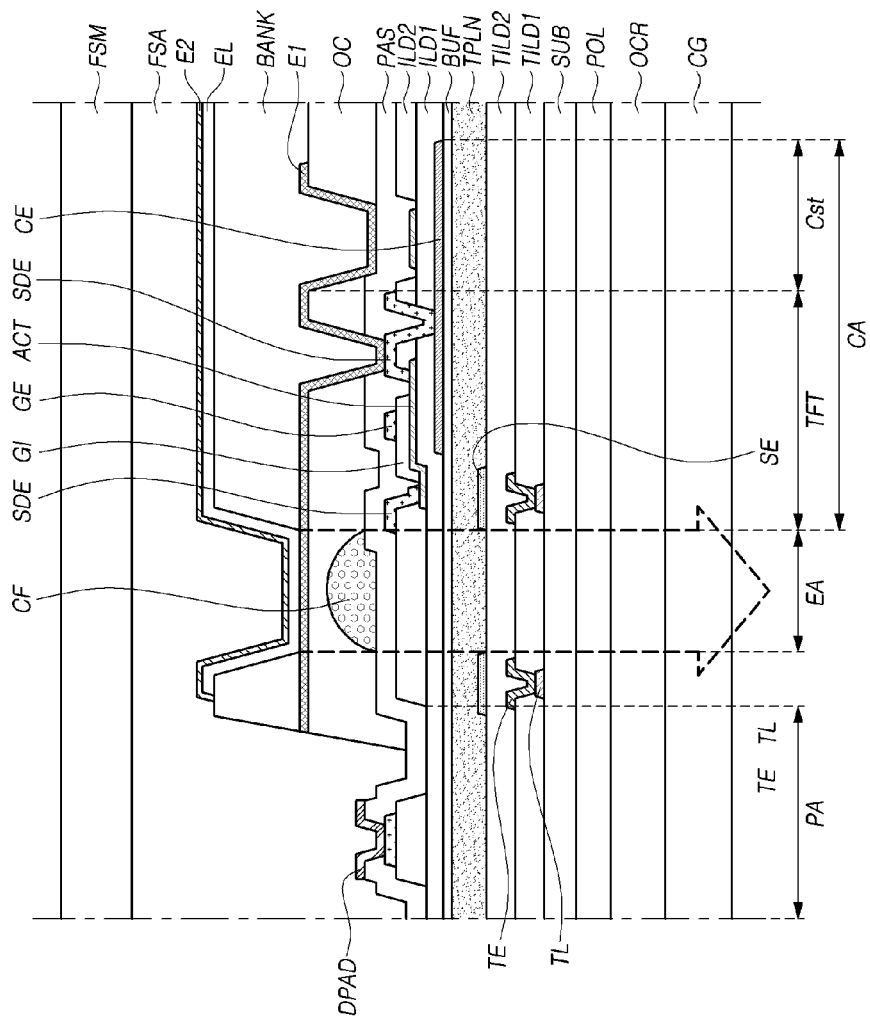
FIGS. 14A and 14B illustrate a structure of a pad area of the touch display device according to embodiments of the present disclosure.
Figure 14B:
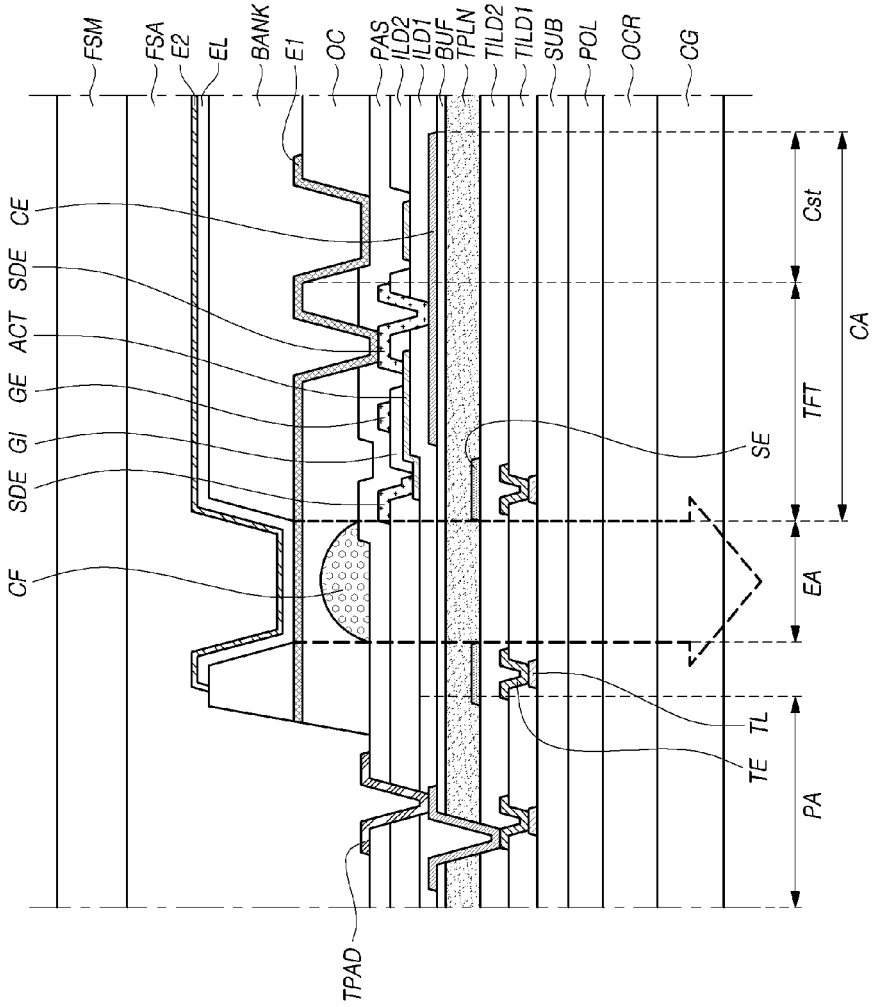

FIGS. 14A and 14B illustrate a structure of a pad area PA of the touch display device 100 according to embodiments of the present disclosure. FIG. 14A illustrates a disposed structure of a data pad DPAD to which a signal for display driving is applied, and FIG. 14B illustrates a disposed structure of a touch pad TPAD to which a signal for touch driving is applied.

Referring to FIGS. 14A and 14B, in the touch display panel 110, a sub-pixel SP may include a light emitting area EA and a circuit area CA. Further, the circuit area CA may include an area TFT in which a thin film transistor is disposed and an area Cst in which a capacitor is disposed. In some instances, at least a part of the thin film transistor area TFT may overlap with at least a part of the capacitor area Cst.

The thin film transistor or a light emitting element may be electrically connected to a data line DL for providing a data voltage to a sub-pixel SP. Further, the data line DL may be electrically connected to the data pad DPAD in the pad area PA.

Here, the data pad DPAD may be electrically connected to a line formed from a material equal to a source/drain electrode SDE included in the thin film transistor.

A touch electrode TE and a touch routing line TL may be disposed in at least a part of an area except for the light emitting area EA of the sub-pixel SP. The touch electrode TE etc. may be disposed under the thin film transistor and light emitting element. Further, a shielding electrode SE may be disposed between the touch electrode TE and the light emitting element etc.

The touch pad TPAD for providing a touch driving signal to the touch electrode TE may be disposed in a similar structure to the data pad DPAD.

For example, the touch pad TPAD may be electrically connected to the touch routing line TL through a pattern formed with an equal material to a capacitor electrode CE and a pattern formed with an equal material to the touch electrode TE.

Further, when a shielding signal is provided to the shielding electrode SE, a pad for providing the shielding signal to the shielding electrode SE may be also formed with a structure similar to the touch pad TPAD.

In a structure in which the touch electrode TE etc. is disposed between a substrate SUB and the thin film transistor, by providing a structure in which the touch electrode etc. is electrically connected to the pad through a material included in the touch electrode TE or the thin film transistor, it is possible to provide a structure capable of easily supplying a touch driving signal or a shielding signal.

In accordance with the embodiments of the present disclosure, it is possible easily to dispose elements/components for touch sensing in a display device with the bottom emission structure through a structure in which the touch electrode TE and a touch planarization layer TPLN are disposed on the substrate SUB.

Further, by disposing the shielding electrode SE between the touch electrode TE and the light emitting element etc., it is possible to reduce a noise of a touch sensing signal caused by the driving of the light emitting element.

Accordingly, by enabling touch sensing to be performed independently of a period in which display driving is performed, it is possible to provide a display device 100 with an improved touch sensing performance.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present disclosure. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present disclosure.

What is claimed is:

1. A touch display device comprising:
   a substrate having an emitting area and a circuit area in an active area;
   a plurality of light emitting elements having a first electrode, a second electrode, and a light emitting layer and overlapping with the emitting area in the active area;
   a plurality of touch electrodes disposed between the substrate and the plurality of light emitting elements;
   a plurality of touch routing lines disposed between the substrate and the plurality of light emitting elements; and
   at least one shielding electrode disposed between at least one light emitting element among the plurality of light emitting elements and at least one touch electrode among the plurality of touch electrodes;
   wherein a first touch routing line among the plurality of touch routing lines is electrically connected to a first touch electrode among the plurality of touch electrodes via a first contact hole overlapping with the circuit area in the active area, the circuit area including a first thin film transistor for driving a light emitting element, wherein the at least one shielding electrode overlaps with the first contact hole overlapping with the circuit area in the active area, the first touch electrode and the first touch routing line.

2. The touch display device according to claim 1, wherein a shielding signal is applied to the at least one shielding electrode in at least a part of a period in which a touch driving signal is applied to the first touch electrode, and wherein at least one of a frequency, a phase, and an amplitude of the shielding signal is equal to at least one of a frequency, a phase, and an amplitude of the touch driving signal.

3. The touch display device according to claim 1, wherein a constant voltage is applied to the at least one shielding electrode in at least a part of a period in which a touch driving signal is applied to the first touch electrode.

4. The touch display device according to claim 1, wherein the at least one shielding electrode includes a main shielding electrode and a sub shielding electrode located to be spaced apart from a side portion of the first touch electrode.

5. The touch display device according to claim 4, wherein the main shielding electrode and the sub shielding electrode are separated from each other, and a signal equal to a signal applied to the main shielding electrode is applied to the sub shielding electrode.

6. The touch display device according to claim 4, wherein the main shielding electrode and the sub shielding electrode are electrically connected to each other via a second contact hole.

7. The touch display device according to claim 4, wherein the sub shielding electrode is disposed in a layer equal to the first touch electrode.

8. The touch display device according to claim 1, wherein the at least one shielding electrode includes a first part located over the first touch electrode and the first touch routing line, and a second part extending from the first part and extending toward the substrate such that the at least one shielding electrode further encloses the first touch electrode and the first touch routing line.

9. The touch display device according to claim 8, wherein a lower portion of the second part is located under the the first touch electrode.

10. The touch display device according to claim 1, further comprising a touch planarization layer located on the at least one shielding electrode.

11. The touch display device according to claim 1, wherein a color filter is located between the first electrode of the at least one light emitting element and the at least one shielding electrode.

12. The touch display device according to claim 1, wherein a constant voltage or a signal equal to a signal applied to the first touch electrode is applied to the at least one shielding electrode at a period in which a current is provided to first electrode of the at least one light emitting element.

13. The touch display device according to claim 1, wherein the first touch electrode and the at least one shielding electrode has a mesh pattern with at least one opening, the opening located to correspond to the emitting area.

14. The touch display device according to claim 1, further comprising:

a plurality of shielding electrodes, wherein the plurality of shielding electrodes are disposed to correspond to two or more of the touch electrodes, and sequentially driven along a direction in which the touch routing lines are arranged.

15. The touch display device according to claim 1, further comprising:

a plurality of shielding electrodes, wherein the plurality of shielding electrodes are disposed to correspond to two or more of the touch electrodes, and sequentially driven along a direction intersecting a direction in which the touch routing lines are arranged.

16. The touch display device according to claim 1, wherein the first contact hole does not overlap with the emitting area in the active area.

17. The touch display device according to claim 1, wherein the first thin film transistor is disposed on the substrate, and wherein the first contact hole overlaps with the first thin film transistor in the active area.

18. The touch display device according to claim 6, wherein the second contact hole does not overlap with the emitting area in the active area.

19. The touch display device according to claim 6, wherein the first thin film transistor is disposed on the substrate, and wherein the second contact hole overlaps with the first thin film transistor in the active area.

* * * * *